US007125120B2

(12) United States Patent
Aruga

(10) Patent No.: US 7,125,120 B2
(45) Date of Patent: Oct. 24, 2006

(54) ILLUMINATOR AND PROJECTOR

(75) Inventor: Susumu Aruga, Suwagun-Simoswamachi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/879,120

(22) Filed: Jun. 30, 2004

(65) Prior Publication Data
US 2005/0030479 A1    Feb. 10, 2005

(30) Foreign Application Priority Data
Jul. 4, 2003    (JP)    ............................. 2003-192294

(51) Int. Cl.
*G03B 21/14*    (2006.01)
(52) U.S. Cl. .......................... 353/20; 353/84; 385/901; 362/561
(58) Field of Classification Search ................. 353/20, 353/31, 34, 37, 84, 33; 349/5, 7, 8, 9; 348/742, 348/743, 771; 362/551, 559, 560, 561; 385/901
See application file for complete search history.

(56) References Cited

U.S. PATENT DOCUMENTS

| | | | | |
|---|---|---|---|---|
| 5,829,858 | A * | 11/1998 | Levis et al. .................. | 353/122 |
| 6,587,269 | B1 * | 7/2003 | Li ............................... | 359/497 |
| 6,698,891 | B1 * | 3/2004 | Kato ............................ | 353/20 |
| 6,726,328 | B1 * | 4/2004 | Lee .............................. | 353/20 |
| 6,739,723 | B1 * | 5/2004 | Haven et al. ................. | 353/20 |
| 6,739,726 | B1 * | 5/2004 | Li ............................... | 353/98 |
| 6,771,325 | B1 * | 8/2004 | Dewald et al. ............. | 348/743 |
| 6,795,243 | B1 * | 9/2004 | McGettigan et al. ........ | 359/486 |
| 6,802,610 | B1 * | 10/2004 | Lee .............................. | 353/20 |
| 6,840,623 | B1 * | 1/2005 | Li ............................... | 353/20 |
| 6,898,019 | B1 * | 5/2005 | Hewlett et al. ............. | 359/634 |
| 7,016,572 | B1 * | 3/2006 | Chiang et al. ................ | 385/39 |
| 7,036,937 | B1 * | 5/2006 | Tseng et al. .................. | 353/20 |
| 7,040,766 | B1 * | 5/2006 | Hibi et al. ..................... | 353/99 |
| 7,050,679 | B1 * | 5/2006 | Chiang et al. ................ | 385/39 |
| 2003/0007130 | A1 * | 1/2003 | Maximus ..................... | 353/20 |
| 2003/0007245 | A1 * | 1/2003 | Edlinger et al. ............ | 359/487 |
| 2003/0021098 | A1 * | 1/2003 | Chang .......................... | 362/19 |
| 2003/0112417 | A1 * | 6/2003 | Yoon ............................ | 353/84 |
| 2003/0197834 | A1 * | 10/2003 | Kang ........................... | 353/31 |
| 2005/0036203 | A1 * | 2/2005 | Ferri et al. ................... | 359/501 |
| 2005/0157263 | A1 * | 7/2005 | Sakata et al. ................ | 353/20 |
| 2005/0231690 | A1 * | 10/2005 | Newell et al. ................ | 353/20 |

FOREIGN PATENT DOCUMENTS

JP    A 2001-242416    9/2001

* cited by examiner

*Primary Examiner*—William C. Dowling
(74) *Attorney, Agent, or Firm*—Oliff & Berridge, PLC

(57) ABSTRACT

Aspects of the invention can provide an illuminator and others, which are able to supply polarized light having a certain oscillating direction as well as a certain wavelength range with high efficiency, and are suitable for a single-plate type projector using an LCD type spatial light modulator. The illuminator can include a light source, a rod integrator, a reflective polarizing plate, and a color filter. A reflecting mirror reflects polarized light, which has been reflected by the reflective polarizing plate, got injected into the rod integrator again through an emitting end, and progresses in the direction toward an injection end, in the direction toward the emitting end. Further, the reflecting mirror reflects light of any other wavelength range, which has been emitted through a first position of the emitting end, reflected by the color filter, got injected into the rod integrator again, and progresses in the direction toward an injection end, in the direction toward the emitting end to emit the light a second position that is different from the first position of the emitting end.

9 Claims, 10 Drawing Sheets

ILLUMINATOR AND PROJECTOR

BACKGROUND OF THE INVENTION

1. Field of Invention

Aspects of the invention relate to an illuminator and a projector, especially to an illuminator of a projector using an LCD type spatial light modulator.

2. Description of Related Art

Single-plate type projectors using the sequential color recapture method (hereinafter, called "the color recapture method") can be used in projectors. A projector using the color recapture method can include a light source to supply light, a rod integrator to uniform the light coming from the light source, and a color wheel for color separation positioned on the emitting side of the rod integrator. The color wheel achieves color separation of the light from the light source into 3 wavelength ranges, namely, e.g., red light (R-light), green light (G-light), and blue light (B-light). Technologies for projectors using the color recapture method are proposed in, for example, Japanese laid-open patent publication No. 2001-242416.

SUMMARY OF THE INVENTION

To achieve color separation for the light from the light source into R-light, G-light, and B-light, the color wheel can be equipped with an R-light-pass dichroic film, a G-light-pass dichroic film, and a B-light-pass dichroic film, each of which allows only R-light, G-light and B-light to pass through, respectively. Each dichroic film allows only the light of its specific wavelength range to pass through, and reflects the light of any other wavelength range outside the foregoing one. The light reflected by the dichroic film progresses in the direction counter to what the light progressed in until it has reached the dichroic film, and then the light enters the rod integrator. The light source side end of the rod integrator is equipped with a reflecting surface. Therefore, the light reflected by the dichroic film is reflected by the reflecting surface of the rod integrator so as to progress again in the direction toward the color wheel. The light progressing again in the direction toward the color wheel follows a light path that is different from what the light followed when it got injected into the color wheel at first. Meanwhile, the color wheel is revolving at high speed on its axis that is almost parallel to the optical axis. The light, which is going to re-enter the color wheel, eventually gets injected into a point of the color wheel that is different from where it was positioned when being injected into the color wheel at the first time. Thus, some element of the light progressing again in the direction toward the color wheel is able to pass through the color wheel. By repeating these procedures, the utilization efficiency of the light can be improved.

However, for such a spatial light modulator of a projector using the color recapture method of the conventional technology, it is necessary to drive at high speed in order to keep up with high-speed revolving of the color wheel.

For example, the color wheel can be equipped with the R-light-pass dichroic film, G-light-pass dichroic film, and B-light-pass dichroic film, which are formed spirally for revolving operation. For displaying images by using a projector, each color light requires its driving speed around 60 Hz. As a result, while using the 3 colors, i.e., R-light, G-light and B-light, the spatial light modulator needs to drive at a speed around 180 Hz (=60 Hz multiplied by 3) per 1 frame. Therefore, in the case of any spatial light modulator, for which it is difficult to drive at high speed, namely such as a single-plate type projector using an LCD type spatial light modulator; it becomes difficult to adopt the color recapture method using a color wheel.

In consequence, when an LCD type spatial light modulator is used, there comes up a problem that it is difficult to improve the utilization efficiency of the light while operating a single-plate type projector. Such an LCD type spatial light modulator controls the transmittance or reflection factor of the polarized light for improvement of the utilization efficiency of the light. Therefore, if an LCD type spatial light modulator is used as the spatial light modulator, the illuminator needs to supply the polarized light having a certain oscillating direction with good efficiency.

An aspect of the invention has been realized to solve the problem described above, and enables to supply the polarized light of a certain oscillating direction and a certain wavelength range with high efficiency. A purpose of the invention can be to make an offer of an illuminator suitable for a single-plate type projector using an LCD type spatial light modulator, and a projector using such an illuminator.

An exemplary illuminator can include a light source to supply light, a rod integrator to nearly uniform luminous intensity distribution of the light coming from the light source, a reflective polarizing plate, positioned on the emitting side of the rod integrator, allowing the polarized light of a certain oscillating direction to penetrate and reflecting the polarized light of any oscillating directions other than the foregoing one, and a color filter allowing the light of a certain wavelength range to penetrate and reflecting the light of any wavelength ranges other than the foregoing one among the light that has penetrated the reflective polarizing plate.

As its features, the rod integrator can further be provided with an injection end on the light source side, an aperture formed in the injection end for letting in the light coming from the light source, a reflecting part formed around the aperture, and an emitting end on the side of the reflective polarizing plate. The reflecting part can reflect the polarized light, which has been reflected by the reflective polarizing plate and re-entered into the rod integrator through the emitting end to progress toward the injection end, in the direction toward the emitting end.

The reflecting part can also reflect the light of any wavelength ranges other than the forgoing certain one, which has been emitted through a first position of the emitting end and reflected by the color filter to re-enter the rod integrator and progress toward the injection end, in the direction toward the emitting end so as to emit the light through a second position of the emitting end that is different from the first position.

The polarized light of a certain oscillating direction among what has left the rod integrator can be emitted from the reflective polarizing plate. Meanwhile, the polarized light of any other oscillating directions is reflected by the reflective polarizing plate to get injected into the rod integrator again through the emitting end. In case of a rod integrator composed of glass for example, the polarized light injected into the rod integrator again progresses in the direction toward the injection end while repeating its total internal reflection at the interface to the air. Passing through various complex light paths by repeating reflection inside the rod integrator or once getting emitted through the aperture and then being injected into the rod integrator again via the light source and so on, the light injected again eventually becomes elliptically-polarized light. Then the light, which has become elliptically-polarized, is reflected at the reflecting part of the injection end in the direction toward the emitting end. The elliptically-polarized light reflected at the reflecting part is emitted from the emitting end. Then, the reflective polarizing plate allows the polarized light of the certain oscillating direction among the elliptically-polarized light to pass through, and reflects the polarized light of any other oscillating directions. Therefore, the polarized light of any other oscillating directions, reflected by the reflective polarizing plate, progresses on the light paths described above while repeating its total internal reflection again.

As a result of these recycling operations (recycling) of the polarized light on the light paths between the reflecting part of the injection end and the reflective polarizing plate, the polarized light of the certain oscillating direction can be successively extracted by the reflective polarizing plate. Consequently, the polarized light of the certain oscillating direction can be obtained with high efficiency. Furthermore, it is preferably expected to place a λ/4 phase plate in the rod integrator. The λ/4 phase plate converts the polarized light reflected by the reflective polarizing plate, such as linear polarized light, to circular polarized light. The circular polarized light, converted by the λ/4 phase plate, causes a phase shift of π each time of its total internal reflection or reflection, so that the turning direction of the polarized light gets changed.

Meanwhile, the linear polarized light, which has been converted to have the certain oscillating direction after passing through the λ/4 phase plate again, passes through the reflective polarizing plate. On the other hand, the linear polarized light, which has been converted to have any oscillating direction other than the foregoing certain one after passing through the λ/4 phase plate again, gets reflected by the reflective polarizing plate to repeat the recycling operations described above. Thus, the reflection under the circular polarized condition in the rod integrator further makes it possible to extract the linear polarized light as required with better efficiency.

The polarized light, which has been emitted through a first position of the emitting end of the rod integrator and has passed through the reflective polarizing plate, gets injected into the color filter. The color filter allows the light of a certain wavelength range to pass through, and reflects the light of any wavelength ranges other than the foregoing one. In other words, the color filter allows the light furthermore provided with the certain wavelength range among the polarized light, which has the certain oscillating direction and could pass through the reflective polarizing plate, to pass through. On the other hand, the light of any other wavelength ranges, which is reflected by the color filter, passes through the reflective polarizing plate and re-enter the rod integrator through the emitting end of the rod integrator. Then, as described above, the reflecting part of the injection end reflects the light of any other wavelength ranges, which progresses in the direction toward the injection end while repeating its total internal reflection in the rod integrator, in the direction toward the emitting end.

The light of any other wavelength ranges, which has been reflected by the reflecting part, is emitted through the second position of the emitting end that is different from the first position. Thus, the light of any other wavelength ranges among the polarized light, which has the certain oscillating direction and could pass through the reflective polarizing plate, is emitted through the second position of the emitting end that is different from the first position. As a result, the light of any other wavelength ranges, which enters the color filter for the second time, eventually gets injected into a position in the color filter that is different from where the light was injected for the first time. Therefore, if the color filter consists of, e.g., 3 color filter elements, each of which individually allows R-light, G-light or B-light to pass through; the light injected into the color filter but eventually reflected at first is injected at the second time into a position in the color filter that is different from where the light was injected at first. Then, the light may sometimes be able to pass through the color filter at the second injection position. If the light enters the color filter for the second time but still gets reflected, the light progresses again on the light paths as described above while repeating its total internal reflection. As a result of these recycling operations (recycling) of the light on the light paths between the reflecting part of the injection end and the color filter, the light of the certain wavelength range can be successively extracted by the color filter. Consequently, the light of the certain wavelength range can be obtained with high efficiency. Thus, by applying the construction described above, the light having the certain oscillating direction and the certain wavelength range can be obtained with high efficiency.

Furthermore, as a preferred mode, it is desirable that a lens assembly is placed on the light path between the reflective polarizing plate and the color filter, and then the lens assembly establishes a conjugated relationship between the emitting end of the rod integrator and the color filter, and it also lights up the color filter in a telecentric manner with the light emitted from the emitting end of the rod integrator.

To make the light go back and forth efficiently between the reflecting part of the injection end of the rod integrator and the color filter, it is needed to efficiently inject the light reflected by the color filter into the emitting end of the rod integrator. The lens assembly under this mode establishes a conjugated relationship between the emitting end of the rod integrator and the color filter. Therefore, the emitting end of the rod integrator and the color filter are in their relationship of "Object vs. Image". In other words, the light of any other wavelength ranges, which is emitted from a certain position of the emitting end of the rod integrator and reflected by the color filter, eventually returns to the position of the emitting end. Thus, it can be avoided that the light reflected by the color filter progresses in any other direction, for example, so as not to enter the emitting end of the rod integrator. Then, high utilization efficiency of the light can be obtained. The lens assembly is also provided with a function to light up the color filter in a telecentric manner. For example, there is sometimes a chance to use an LCD type spatial light modulator in combination with an illuminator under this mode. For such an LCD type spatial light modulator, there exists restriction on the angular range of the injected light for modulating the injected light according to the image signal, because of LCD's characteristics. If the color filter is lit up in a telecentric manner, the LCD type spatial light modulator placed to be nearly parallel to the color filter is also lit up in a telecentric manner. When the LCD type spatial light modulator is lit up in a telecentric manner, main beams are injected in the direction nearly perpendicular to its modulation surface. The LCD type spatial light modulator can most efficiently modulate the light injected in the direction nearly perpendicular to its modulation surface. Therefore, if an illuminator under this mode is used for the LCD type spatial light modulator, it becomes possible to use the light with good efficiency.

Furthermore, according to the preferred mode, it is desirable that the rod integrator is tapered to be conical so that the area of the injection end is smaller than that of the emitting end.

When the light goes back and force inside the rod integrator being tapered to be conical so that the area of the injection end is smaller than that of the emitting end, the light from the emitting end is emitted in the direction, which has a smaller angular displacement from the centerline axis of the rod integrator, namely being almost parallel to the centerline axis. Therefore, if the color filter is placed to be almost perpendicular to the centerline axis of the rod integrator, the light emitted from the rod integrator gets injected into the color filter while being in nearly parallel to the optical axis AX, i.e., in a telecentric manner. Thus, it can be avoided that the light reflected by the color filter progresses in any other direction, for example, so as not to enter the emitting end of the rod integrator. Then, high utilization efficiency of the light can be obtained. Therefore, if an illuminator under this mode is used for the LCD type spatial light modulator, it becomes possible to use the light with good efficiency due to the telecentric lighting.

An exemplary illuminator, can include a light source to supply light, a rod integrator to nearly uniform intensity distribution of the light coming from the light source, a polarization conversion element, positioned on the emitting side of the rod integrator, converting the light from the light source to polarized light of a certain oscillating direction and emitting the converted light, and a color filter allowing the light of a certain wavelength range to penetrate and reflecting the light of any wavelength ranges other than the foregoing one among the light emitted from the polarization conversion element. The rod integrator can further be provided with an injection end on the side of the light source, an aperture formed in the injection end for letting in the light coming from the light source, a reflecting part formed around the aperture, and an emitting end on the side of the polarization conversion element. The reflecting part can also reflect the light of any wavelength ranges other than the forgoing certain one, which has been reflected by the color filter to re-enter the rod integrator through a first position of the emitting end and progress toward the injection end, in the direction toward the emitting end so as to emit the light again through a second position of the emitting end that is different from the first position.

In the second exemplary embodiment of the invention, the polarization conversion element converts the light from the light source to polarized light of a certain oscillating direction and emits the converted light. Then, the polarized light of the certain oscillating direction gets injected into the color filter. Then, as implemented by the first invention described above; through the recycling operations (recycling) of the light on the light paths between the reflecting part of the injection end and the color filter, the light of the certain wavelength range can be successively extracted by the color filter. Consequently, the light of the certain wavelength range can be obtained with high efficiency. Thus, by applying the second invention, the light having the certain oscillating direction and the certain wavelength range can be obtained with high efficiency.

Furthermore, as a preferred mode, it can be desirable that the polarization conversion element includes a polarization separation unit that orient their peak points nearly toward the light source and their cross section is nearly triangular, a plurality of polarized light separating films formed on slopes, being oriented toward the light source, of the polarization separation units, and a plurality of reflecting surfaces formed to be nearly parallel to the polarized light separating films. The polarized light separating films are so placed as to have a certain specific angle in relation to the centerline axis of the injected light coming from the light source. The polarized light separating films allow the polarized light, provided with a first oscillating direction, of the light coming from the light source to penetrate, and reflect the polarized light, provided with a second oscillating direction lying nearly at a right angle to the first oscillating direction. The reflecting surfaces can reflect the polarized light, provided with the second oscillating direction and reflected by the polarized light separating films, nearly into the same direction as the polarized light of the first oscillating direction progresses. Further, in the light path of the polarized light provided with the second oscillating direction that comes from the reflecting surfaces, a plurality of phase plates are installed to convert the polarized light having the second oscillating direction into polarized light having the first oscillating direction.

Under this exemplary mode, the polarization separation units orient their peak points nearly toward the light source and their cross section is nearly triangular. Then, the polarized light separating films are formed on the slopes, being oriented toward the light source, of the polarization separation units. Thus, the polarized light separating films allow the polarized light, provided with the first oscillating direction, of the light coming from the light source to penetrate, and reflect the light, provided with the second oscillating direction, into two directions being placed to be almost face to face in relation to the slopes. Then, the polarized light with the second oscillating direction, reflected at the slopes into the two directions, is further reflected at the reflecting surfaces nearly into the same direction as the light of the first oscillating direction, which has passed through the polarized light separating films, progresses. The polarized light, provided with the second oscillating direction and reflected at the reflecting surfaces into the two directions, is each converted by the phase plates to have the first oscillating direction.

Thus, at the emission end of the polarization conversion element; it is possible to bring the positions of the polarized light provided with the first oscillating direction, which has passed the polarized light separating films, and the polarized light, which has been reflected by the polarized light separating films and subsequently converted to have the first oscillating direction from the second oscillating direction, close to each other. Moreover, the light provided with the second oscillating direction is reflected by the polarized light separating films into the two directions being placed to be almost face-to-face. Therefore, the light, which is going to be converted to have the first oscillating direction from the second oscillating direction, can be emitted from the positions that are almost symmetrically placed about the position of the light having the first oscillating direction. Thus, when the light, reflected by the color filter, passes through the polarization conversion element again, the optical axis of the injected light does not get shifted in any other direction. As a result, the light can be recycled efficiently on the light paths between the reflecting part of the injection end and the color filter.

Furthermore, as a preferred mode, it can be desirable that the polarized light separating films are also equipped with an injection end that is nearly perpendicular to the centerline axis of the injected light, wherein, the polarized light separating films and the injection end cause an angle of 45 degrees, the centerline axis of the injected light coming from the light source is almost consistent with that of the emitted light from the polarization conversion element.

Under this mode, the polarized light separating films can also be equipped with an injection end that is nearly perpendicular to the centerline axis of the injected light, wherein, the polarized light separating films and the injection end cause an angle of 45 degrees. Thus, the polarization conversion element emits the light, uniformly provided with the first oscillating direction, nearly all in the parallel directions. Accordingly, it becomes possible to lighten up the color filter in a telecentric manner. Furthermore, the centerline axis of the injected light coming from the light source is almost consistent with that of the emitted light from the polarization conversion element. Thus, when the light, reflected by the color filter, passes through the polarization conversion element again, the optical axis does not get shifted additionally in any other direction. Therefore, high utilization efficiency of the light can be obtained. Then, if an illuminator under this mode is used for the LCD type spatial light modulator, it becomes possible to use the light with good efficiency due to the telecentric lighting.

Furthermore, as a preferred mode for the first and second inventions, it is desirable that the light of the certain wavelength range, which the color filter allows to penetrate, includes at least red light, green light and blue light. When the light of the certain wavelength range, which the color filter allows to penetrate, includes at least R-light, G-light, and B-light, well-lighted full-color illumination can be materialized with high utilization efficiency of the light.

An exemplary projector, can include the illuminator described above, an LCD type spatial light modulator placed at a position in relation to the color filter to modulate the injected light according to image signals and emit it, and a projection lens that projects the light modulated by the LCD type spatial light modulator.

Using the illuminator described above, the projector can create well-lighted images with high utilization efficiency of the light. Furthermore, even if any other spatial light modulator, for which it is difficult to implement high-speed and complicated driving, is used; adopting the invention makes it possible to apply a single-plate type projector and to improve utilization efficiency of the light.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
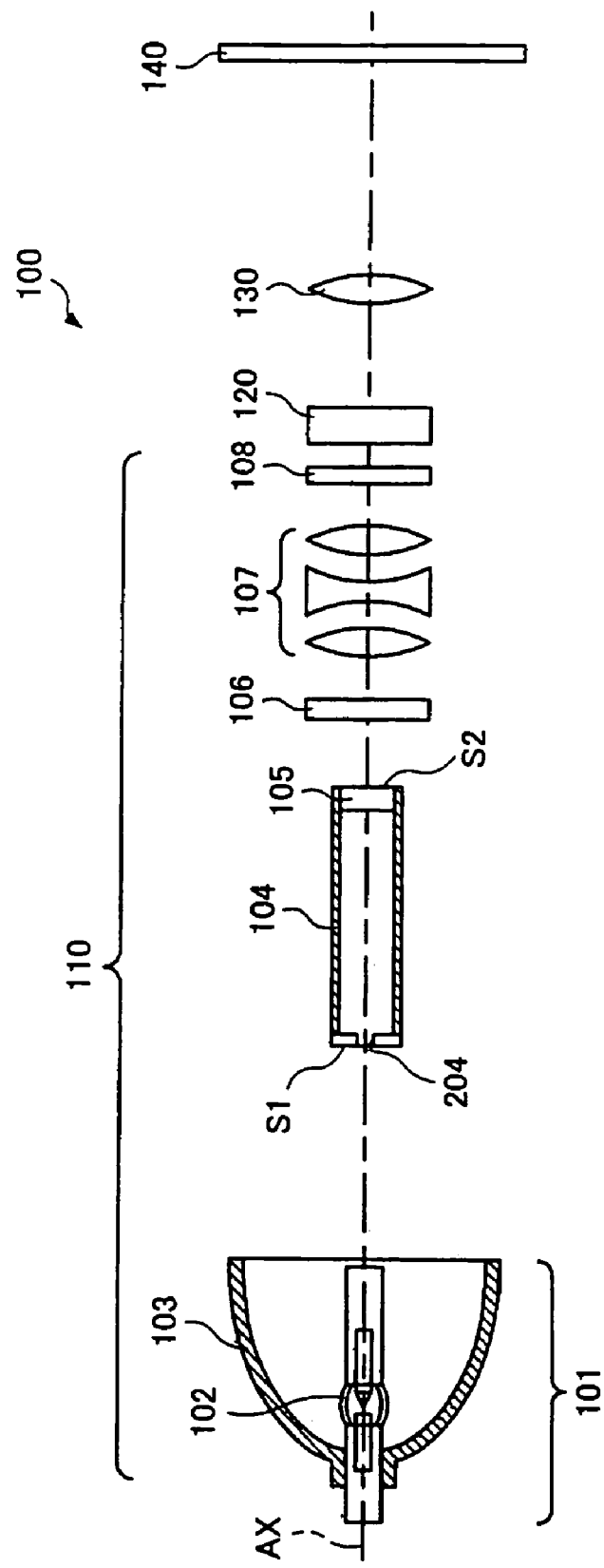
FIG. 1 is a drawing of a general structure of a projector according to a first embodiment of the invention.

The following sections describe preferred exemplary embodiments of the inventions in detail while referring to the drawings:

FIG. 1 shows the high level structure of a projector according to an exemplary embodiment of the invention. A projector 100 can include an illuminator 110, an LCD type spatial light modulator 120, and a projection lens 130. The illuminator 110 of the projector 100 can be able to supply the polarized light having a certain oscillating direction with high efficiency by using a rod integrator 104 and a reflective polarizing plate 106. Furthermore, the illuminator 110 can supply the light of a certain wavelength range with high efficiency by using the rod integrator 104, a condenser lens 107, and a color filter 108.

A light source 101 of the illuminator 110 is composed of a lamp 102 and an oval reflector 103. As the lamp 102, for example, an ultra high pressure mercury lamp can be used. The light from the lamp 102 directly, or after once getting reflected by the reflector 103, progresses toward the rod integrator 104. An injection end S1 of the rod integrator 104 is equipped with an aperture 204 to inject the light from the light source 101 into the rod integrator 104. On this occasion, by gathering the light reflected by the reflector 103 into the aperture 204 of the rod integrator 104, the light supplied from the light source 101 can efficiently be utilized. Construction of the light source 101 is not necessarily limited to what is composed of the lamp 102 and reflector 103, as far as the light can efficiently be supplied into the aperture 204.

FIG. 2(a) shows a general structure of the rod integrator 104 in its section including an optical axis AX. FIG. 2(b) shows a structure of the rod integrator 104 being viewed from a side of the injection end S1. The rod integrator 104 function to make nearly uniform a luminous intensity distribution of the light coming from the light source 101. Then, the rod integrator 104 has a hollow structure with its section being almost rectangular, and equipped with the injection end S1 on a side of the light source 101 and an emitting end S2 on a side of a reflective polarizing plate 106. At an internal surface around the aperture 204 inside the rod integrator 104, there is formed a reflecting mirror 202a as a reflecting part. The reflecting mirror 202a can be formed by depositing a metallic material, for example, such as aluminum, silver or the like. Moreover, there is also formed a reflecting mirror 202b on an internal surface of the rod integrator 104.

Around the emitting end S2 of the rod integrator 104, there is placed a λ/4 phase plate 105, which is described below. Light emitted from the emitting end S2 of the rod integrator 104 enters the reflective polarizing plate 106 positioned on the emitting side of the rod integrator 104. The reflective polarizing plate 106 allows the polarized light of a certain oscillating direction, e.g., P-polarized light, to penetrate, and reflects the polarized light of any oscillating directions other than the foregoing one, e.g., S-polarized light. The light, which has passed through the reflective polarizing plate 106, subsequently passes through the condenser lens 107, and then enters the color filter 108.

Figure 5:
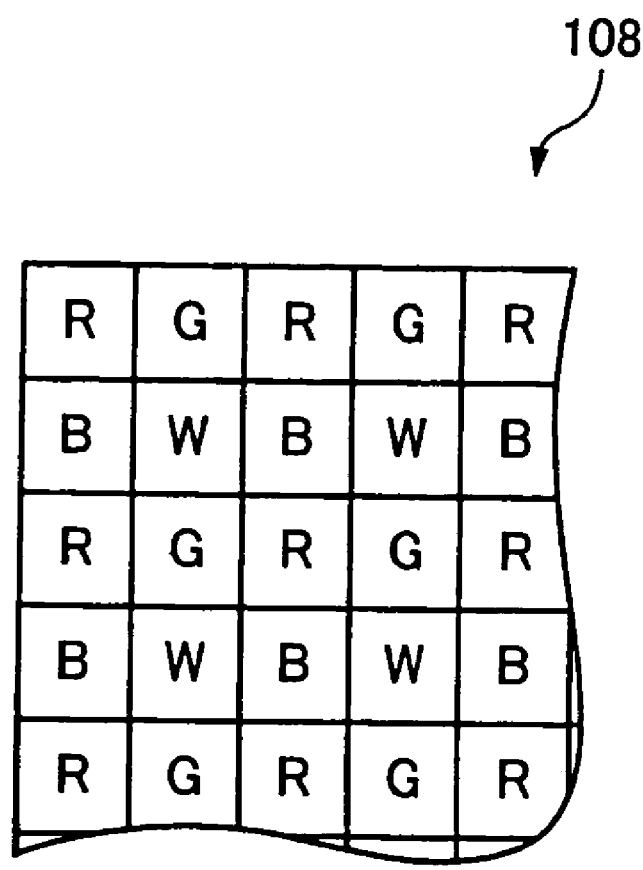
FIG. 5 is a drawing of a sample structure of a color filter.

FIG. 5 shows a sample structure of the color filter 108. In FIG. 5, each of Area-R, Area-G, and Area-B is a specific area to allow R-light, G-light, and B-light as the light of a certain wavelength range to pass through, respectively. For example, a plurality of R-light-pass dichroic films, G-light-pass dichroic films, and B-light-pass dichroic films can be used for the color filter 108. The Area-R allows only R-light as the light of a certain wavelength range to pass through, and reflects G-light and B-light as those of any other wavelength ranges. The R-light, which has passed through the Area-R, progresses in the direction toward the LCD type spatial light modulator 120. The G-light and B-light, which the Area-R has reflected, return toward the rod integrator 104. The Area-G allows G-light to pass through, and reflects R-light and B-light. The Area-B allows B-light to pass through, and reflects R-light and G-light. In this manner, the color filter 108, allows the light of each certain wavelength range to pass through, and reflects those of any other wavelength ranges. Eventually, the color filter 108 achieves color separation of the light coming from the light source 101. When the light of each certain wavelength range that the color filter 108 allows to pass through is R-light, G-light, and B-light; full-color illumination can be materialized. Herein, Area-W in the color filter 108 shown in FIG. 5, is an area to allow the light coming from the condenser lens 107 to pass through as it is. For example, a plurality of colorless transparent films can be used for the Area-W.

Placing Area-W makes it possible to obtain well-lighted perspective images by the light passing through the Area-W. In the LCD type spatial light modulator 120; a set of Area-R, Area-G, Area-B, and Area-W of the color filter 108 forms a pixel. The color filter 108 may have its structure only with Area-R, Area-G, and Area-B, even without having any Area-W. Furthermore, it should be understood that the layout of the area elements in the color filter 108 is not limited to what is illustrated by the figure. As shown in FIG. 1 to be referred to again, the light from the color filter 108 gets injected into the LCD type spatial light modulator 120. The LCD type spatial light modulator 120 modulates the injected light according to image signals and emit it in the direction toward the projection lens 130. Then, the projection lens 130 projects the light, modulated by the LCD type spatial light modulator 120, onto a screen 140.

Figure 2:
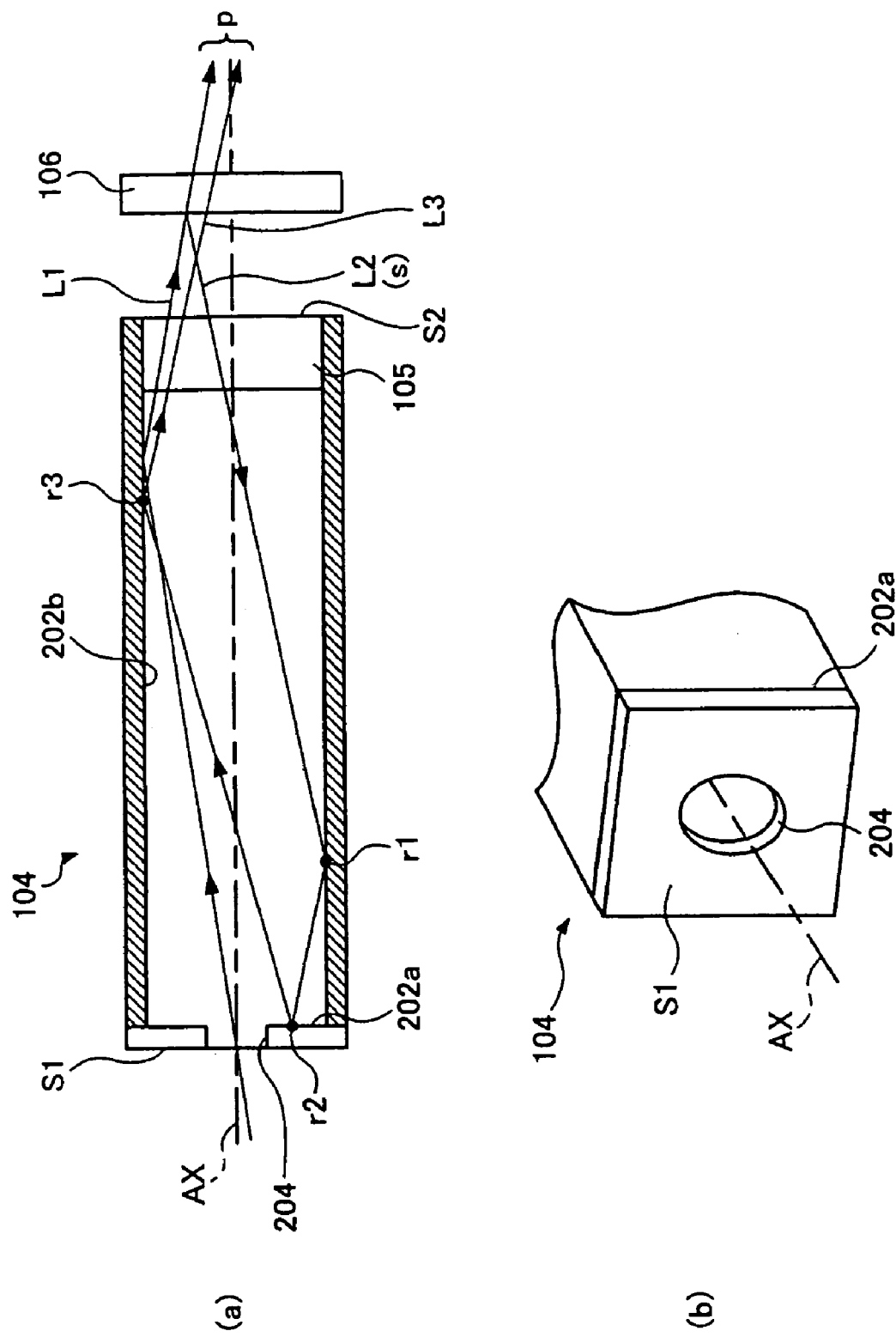
FIG. 2 is for explaining a structure for supplying polarized light of a certain oscillating direction.

The next issue to be described by referring to FIG 2 is a structure for supplying polarized light of a certain oscillating direction. The light, supplied by the light source 101 and injected into the internal area of the rod integrator 104 through the aperture 204, is reflected by the reflecting mirror 202b of the internal section of the rod integrator 104. Then, the light L1, which has passed through the λ/4 phase plate 105 and got emitted from the emitting end S2 of the rod integrator 104, enters the reflective polarizing plate 106. The reflective polarizing plate 106 allows the polarized light of a certain oscillating direction, e.g., P-polarized light, to penetrate. On the other hand, the polarized light of any oscillating directions other than the foregoing one, e.g., S-polarized light, is reflected by the reflective polarizing plate 106, and the polarized light progresses in the direction counter to what the it progressed in until it has reached the reflective polarizing plate 106 (Light L2). Then, the light L2 enters the rod integrator 104 through the emitting end S2.

The light L2, which has entered the rod integrator 104 through the emitting end S2, passes through again the λ/4 phase plate 105. The light L2, being S-polarized light, is converted at this stage to be circular polarized light (e.g., left-hand circular polarized light). The light L2, which has entered the rod integrator 104 again, progresses in the direction toward the injection end S1 while getting reflected by the reflecting mirror 202b.

The light L2, which has entered the rod integrator 104 again, is reflected for the first time at a position r1 on the reflecting mirror 202b. At this time, the plane of polarization of the circular polarized light gets turned by the reflection so that the circular polarized light reverses its turning direction to become the circular polarized light having the reversed turning direction (right-hand circular polarized light). Subsequently, the circular polarized light is reflected at a position r2 on the reflecting mirror 202a positioned around the aperture 204 to become the left-hand circular polarized light again. Being reflected by the reflecting mirror 202a, the light L2 progresses in the direction toward the emitting end S2 again. The left-hand circular polarized light progressing toward the emitting end S2 again is reflected at a position r3 on the reflecting mirror 202b to become the right-hand circular polarized light again. The right-hand circular polarized light, which has progressed toward the emitting end S2, enters the λ/4 phase plate 105 to get converted to become P-polarized light, i.e., linear polarized light. The light, converted to be P-polarized light by the λ/4 phase plate 105, progresses in the direction toward the reflective polarizing plate 106, and then passes through the reflective polarizing plate 106 (Light L3).

What has been described up to here about the light reflection is concerned with movement of only a part of the light reflected by the reflective polarizing plate 106. In reality, most linear polarized light reflected by the reflective polarizing plate 106 repeats complicated reflecting operations between the rod integrator 104 and the reflective polarizing plate 106. Also, some of the linear polarized light reflected by the reflective polarizing plate 106 progresses in the direction toward the injection end S1, and gets emitted from the aperture 204. Then, after getting reflected by the light source 101, the light enters the rod integrator 104 again. Therefore, even without placing the λ/4 phase plate 105, the linear polarized light which has been reflected by the reflective polarizing plate 106 and progressed into the rod integrator 104, becomes elliptically-polarized light. Consequently, it is not necessarily needed to place the λ/4 phase plate 105. However, placing the λ/4 phase plate 105 makes it possible to certainly convert the linear polarized light to the circular polarized light and obtain the polarized light of a certain oscillating direction with high utilization efficiency.

Thus, the polarized light implements recycling operations (recycling) on the light paths between the reflecting mirror 202a of the injection end S1 and the reflective polarizing plate 106. Through these recycling operations, the polarized light of a certain oscillating direction can be successively extracted by the reflective polarizing plate 106. As a result, the polarized light of the certain oscillating direction can be obtained with high efficiency. Incidentally, the rod integrator 104 may not have a hollow structure whose internal surface is equipped with the reflecting mirror 202b as described above, but may have a structure of a rectangular solid prism whose internal section is entirely made of optically-transparent material, for example, glass. When the rod integrator 104 is structured with glass material, the light injected into the rod integrator 104 progresses inside the rod integrator 104 while repeating its total internal reflection at the interface between the glass material and air. In this case, the reflecting mirror 202a as the reflecting part is assembled onto the injection end S1 made of glass material, by adhesion. The light, which has progressed from the emitting end S2 toward the injection end S1, gets reflected by the reflecting mirror 202a and then progresses in the direction toward the emitting end S2 again, as it does in the case of using the reflecting mirror 202b of the hollow structure. Construction of the λ/4 phase plate 105 is not limited to placing the λ/4 phase plate 105 around the emitting end S2. As long as it is possible to reflect the light, which has been converted to be the circular polarized light, by the reflecting mirrors 202a and 202b, the λ/4 phase plate 105 may be placed around the central part of the rod integrator 104 or any adjacent part close to the injection end S1.

Next a structure for supplying light of a certain wavelength range with high efficiency will be described. The P-polarized light emitted from the reflective polarizing plate 106, as the polarized light of a certain oscillating direction, penetrates the condenser lens 107. The condenser lens 107 has a function to make main beams of the light coming from the reflective polarizing plate 106 almost parallel to the optical axis AX. This function makes it possible to light up the color filter 108 in a telecentric manner. Regarding the LCD type spatial light modulator 120, there exists restriction on the angular range of the injected light for modulating the injected light according to the image signal, because of LCD's characteristics. The LCD type spatial light modulator 120 can most efficiently modulate the light injected in the direction nearly perpendicular to its modulation surface. Incidentally, the color filter 108 is lit up in a telecentric manner by the condenser lens 107. Therefore, the LCD type spatial light modulator 120, being placed to be nearly parallel to the color filter 108, is also lit up in a telecentric manner. When the LCD type spatial light modulator 120 is lit up in a telecentric manner, main beams are injected in the direction nearly perpendicular to its modulation surface. As a result, the LCD type spatial light modulator 120 can efficiently modulate the light.

Figure 3:
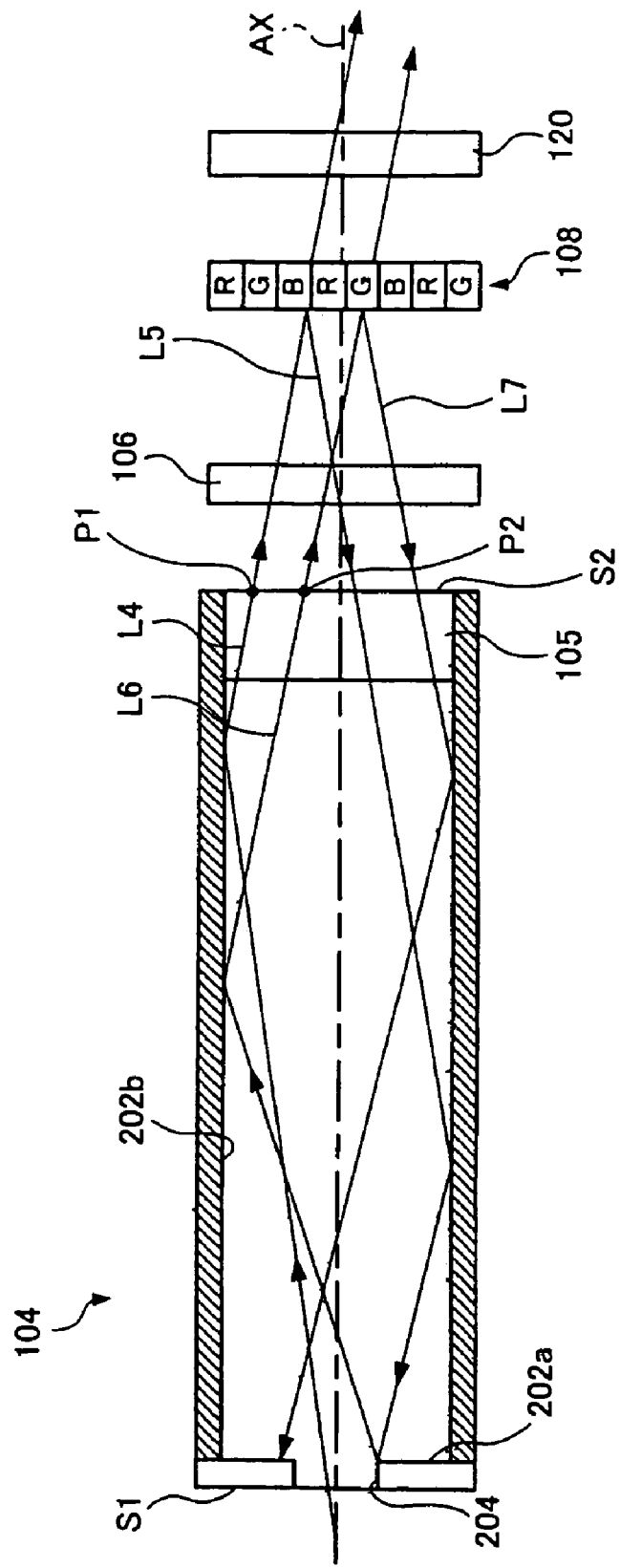
FIG. 3 is for explaining a structure for supplying polarized light of a certain wavelength range.

As described above, the color filter 108 allows the light of a certain wavelength range to pass through, and reflects those of any other wavelength ranges. When the light once reflected by the color filter 108 is fed again toward the color filter 108 to penetrate the color filter 108, it becomes possible to efficiently supply the LCD type spatial light modulator 120 with the light of a certain wavelength range. FIG. 3 shows a structure of the rod integrator 104 and the color filter 108 to supply the LCD type spatial light modulator 120 with the light of a certain wavelength range. To simplify the description, the condenser lens 107 to be positioned between the reflective polarizing plate 106 and the color filter 108 is omitted in FIG. 3.

Functions of the condenser lens 107 for using the light of a certain wavelength range efficiently are described below in detail by referring to FIG. 4. In the color filter 108 shown in FIG. 3, each part of R, G, and B corresponds to Area-R, Area-G, and Area-B described by referring to FIG. 5, respectively. To simplify the description, the color filter 108 shown in FIG. 3 has a structure that is different from what FIG. 5 shows.

The light, which has got injected through the aperture 204 of the rod integrator 104, is reflected by the reflecting mirror 202b inside the rod integrator 104, and then emitted through a first position P1 of the emitting end after passing through the λ/4 phase plate 105 (Light L4). The light L4, emitted through the first position P1, enters the reflective polarizing plate 106. As described above, the reflective polarizing plate 106 allows the polarized light of a certain oscillating direction, e.g., P-polarized light, to penetrate. The P-polarized light, which has penetrated the reflective polarizing plate 106, subsequently enters the color filter 108. The color filter 108 allows the light of a certain wavelength range even among the P-polarized light to pass through. On the other hand, the color filter 108 reflects the light of any other wavelength ranges. For example, as FIG. 3 shows, the light L4 enters an Area-B of the color filter 108. The Area-B allows only B-light as the light of a certain wavelength range to pass through, and reflects R-light and G-light as those of any other wavelength ranges. The B-light, which has passed through the color filter 108, is modulated by the LCD type spatial light modulator 120.

The R-light and G-light reflected by the color filter 108 (Light L5) progress in the direction counter to what they progressed in until they have reached the color filter 108 to pass through the reflective polarizing plate 106. Then, the light L5 enters the rod integrator 104 again through the emitting end S2. The light L5, which has entered the rod integrator 104, progresses in the direction toward the injection end S1 while being reflected by the reflecting mirror 202b, and then gets reflected by the reflecting mirror 202a in the direction toward the emitting end S2. Having been reflected by the reflecting mirror 202a, the light L6 progresses in the direction toward the emitting end S2 while being also reflected by the reflecting mirror 202b subsequently, and it gets emitted through a second position P2 that is different from the first position P1 of the emitting end S2. In the same manner as the light L4 did, the light L6 enters the color filter 108 after passing through the reflective polarizing plate 106. On this occasion, the light L6 has got emitted through second position P2 that is different from the first position P1, through which the light L4 was emitted. As a result, the light L6 gets injected into a position on the color filter 108, which is different from where the light L4 entered.

For example, as shown in FIG. 3, the light L6 gets emitted through the second position P2 and passes through the reflective polarizing plate 106, and then it subsequently enters an Area-G of the color filter 108. As described above, the light L4 entered the Area-B. Thus, the light L6 enters a position that is different from where the light L4 entered. Since the light L6 consists of R-light and G-light, the G-light as the light of a certain wavelength range passes through the color filter 108. Then, the R-light as light of any other wavelength ranges is reflected by the color filter 108, and it progresses in the direction toward the rod integrator 104 again (Light L7).

Thus, any light once injected into the color filter 108 but eventually reflected is, when being injected again next time later into the color filter 108, injected into another position different from where it was once injected. Therefore, the light injected into the color filter 108 again may sometimes be able to pass through the color filter 108. Furthermore, the light injected again into the color filter 108 but still reflected progresses the light paths described above while repeating reflection inside the rod integrator 104. Thus, through the recycling operations (recycling) of the light on the light paths between the reflecting mirror 202a of the injection end S1 and the color filter 108, the light of a certain wavelength range can be successively extracted by the color filter 108. As a result, the light of the certain wavelength range can be obtained with high efficiency.

Figure 4:
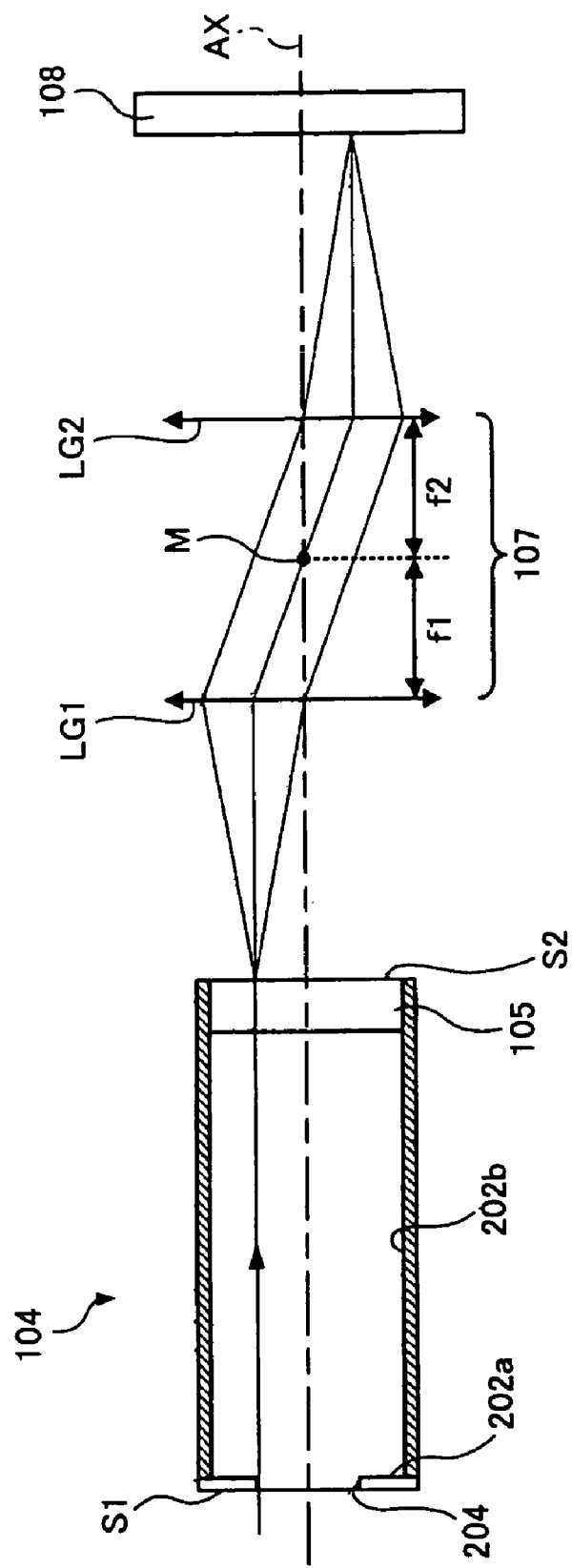
FIG. 4 is for explaining functions of a condenser lens.

The next issue to be described by referring to FIG. 4 is regarding the functions of the condenser lens 107. The condenser lens 107 shown in FIG. 1 consists of 3 lenses, i.e., a biconvex lens, biconcave lens, and another biconvex lens, in due order from the side of the light source 101. Meanwhile, the condenser lens 107 shown in FIG. 4 is divided into two lens assemblies for the sake of convenience in order to explain the lens function, i.e., LG1 as a first lens assembly and LG2 as a second lens assembly. The second lens assembly LG2 of the condenser lens 107 makes main beams of the light emitted from the second lens assembly LG2 almost parallel to the optical axis AX to light up the color filter 108 in a telecentric manner. Furthermore, to obtain the light of a certain wavelength range with high utilization efficiency, it is needed that the light goes back and forth efficiently between the reflecting mirror 202a of the injection end S1 of the rod integrator 104 (refer to FIG. 3) and the color filter 108. Therefore, the condenser lens 107 also has a function to efficiently inject the light reflected by the color filter 108 into the emitting end S2 of the rod integrator 104.

As shown in FIG. 4, placing the condenser lens 107 establishes a conjugated relationship between the emitting end S2 of the rod integrator 104 and the injection end of the color filter 108. The light emitted from a certain position of the emitting end S2 of the rod integrator 104 passes through the condenser lens 107 and gets focused at a position on the injection end of the color filter 108. Since the emitting end S2 of the rod integrator 104 and the injection end of the color filter 108 are in their conjugated relationship, any light reflected by the color filter 108 can surely be injected into the rod integrator 104 through the emitting end S2 of the rod integrator 104. Thus, any light, emitted from a certain position of the emitting end S2 of the rod integrator 104 but reflected by the color filter 108, returns again to the certain position of the emitting end S2. Therefore, it can be avoided that the light reflected by the color filter 108 progresses in any other direction, for example, so as not to enter the emitting end S2 of the rod integrator 104. As a result, high utilization efficiency of the light can be obtained.

The condenser lens 107 is so implemented that the focal points of the first lens assembly LG1 and the second lens assembly LG2 are placed at the same position M. Thus, the first lens assembly LG1 and the second lens assembly LG2 are laid out at distance intervals, with which the focus position f1 of the first lens assembly LG1 and the focus position f2 of the second lens assembly LG2 become the same. According to such an arrangement, the color filter 108 can be lit up in a telecentric manner, and high utilization efficiency of the light can be obtained.

In the projector 100 of the invention, the light of a certain oscillating direction can be utilized efficiently by using the rod integrator 104 and the reflective polarizing plate 106. Moreover, the light of a certain wavelength range can also be utilized efficiently by using the rod integrator 104 and the color filter 108. Thus, in the exemplary embodiment, the light provided with the certain oscillating direction as well as the certain wavelength range can be obtained with high efficiency so that well-lighted images can be materialized. Furthermore, placing the condenser lens 107 makes it possible to light up the color filter 108 in a telecentric manner, and so as to efficiently utilize the light reflected by the color filter 108.

In addition, according to the structure of the present embodiment, it becomes possible to apply a single-plate type of projector for the projector 100 and to improve utilization efficiency of the light, even though any spatial light modulator, for which it is difficult to implement high-speed driving, is used.

Figure 6:
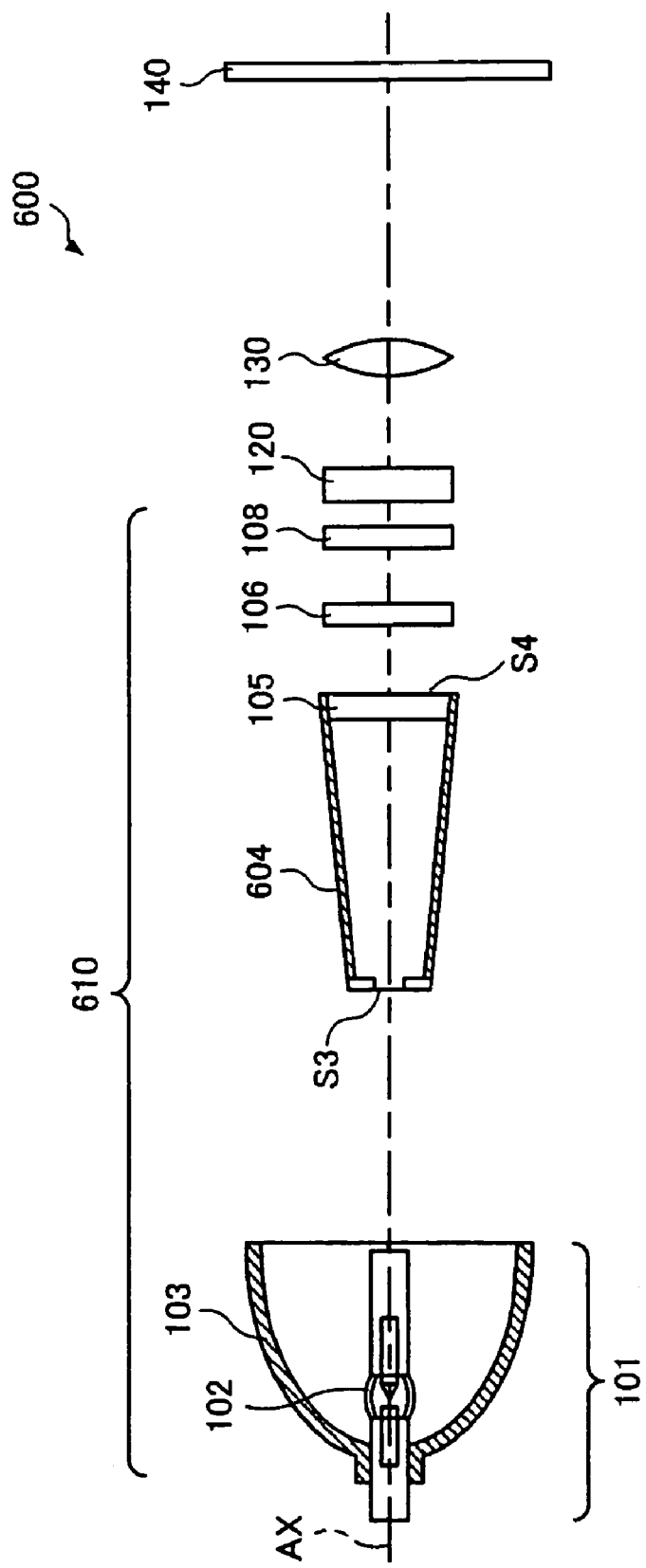
FIG. 6 is a drawing of a general structure of a projector according to a second embodiment of the invention.

FIG. 6 shows a general structure of a projector 600 according to a second exemplary embodiment of the invention. Any part, which also appears as the same function in the first exemplary embodiment, is provided with the same reference number as it has in the first embodiment, and any duplicated description for such a part is omitted. The projector 600 of the present embodiment is characterized by a rod integrator 604 of an illuminator 610. The rod integrator 604 is tapered to be conical so that the area of the injection end S3 is smaller than that of the emitting end S4. The light, which has passed through the λ/4 phase plate 105 and got emitted from the emitting end S4 of the rod integrator 604, enters the reflective polarizing plate 106. Light of a certain oscillating direction penetrates the reflective polarizing plate 106 and then enters the color filter 108. Any light, which the color filter 108 reflects as light of any wavelength ranges other than the certain one, enters the rod integrator 604 again through the emitting end S4.

The light, which has entered through the emitting end S4, repeats reflection inside the rod integrator 604. The rod integrator 604 is tapered to be conical so that the area of the injection end S3 is smaller than that of the emitting end S4. Therefore, the light emitted from the emitting end S4 is emitted in a direction that causes a small angular deviation from the centerline axis of the rod integrator 604, namely, in a direction that is nearly parallel to the centerline axis. When the centerline axis of the rod integrator 604 is nearly parallel to the optical axis AX, the light emitted from rod integrator 604 enters the color filter 108 in a manner so as to make the main beams nearly parallel to the optical axis AX. As a result, it becomes possible to light up the color filter 108 in a telecentric manner.

In addition, it can be avoided that the light reflected by the color filter 108 progresses in any other direction, for example, so as not to enter the emitting end S4 of the rod integrator 604. Thus, an effect of efficiently utilizing the light provided with a certain wavelength range can be produced.

The rod integrator 604 of the exemplary embodiment makes it possible to efficiently utilize the light of a certain wavelength range by adjusting the taper angle in comparison with the centerline axis of the rod integrator 604. Furthermore, the rod integrator 604 also makes it possible to efficiently recycle the light reflected by the color filter 108, even without establishing a conjugated relationship between the emitting end S4 of the rod integrator 604 and the injection end of the color filter 108. Therefore, being different from the illuminator 110 of the projector 100 of the first embodiment, the illuminator 610 of the projector 600 of the exemplary embodiment does not require installation of the condenser lens 107. Incidentally, though the rod integrator 604 has been described as being provided with a tapered conical shape, it is not limited to the shape. For example, any tapered polygonal pyramid shape can be adopted, as far as the shape makes it possible to efficiently inject the light, reflected by the color filter 108, into the rod integrator 604.

Figure 7:
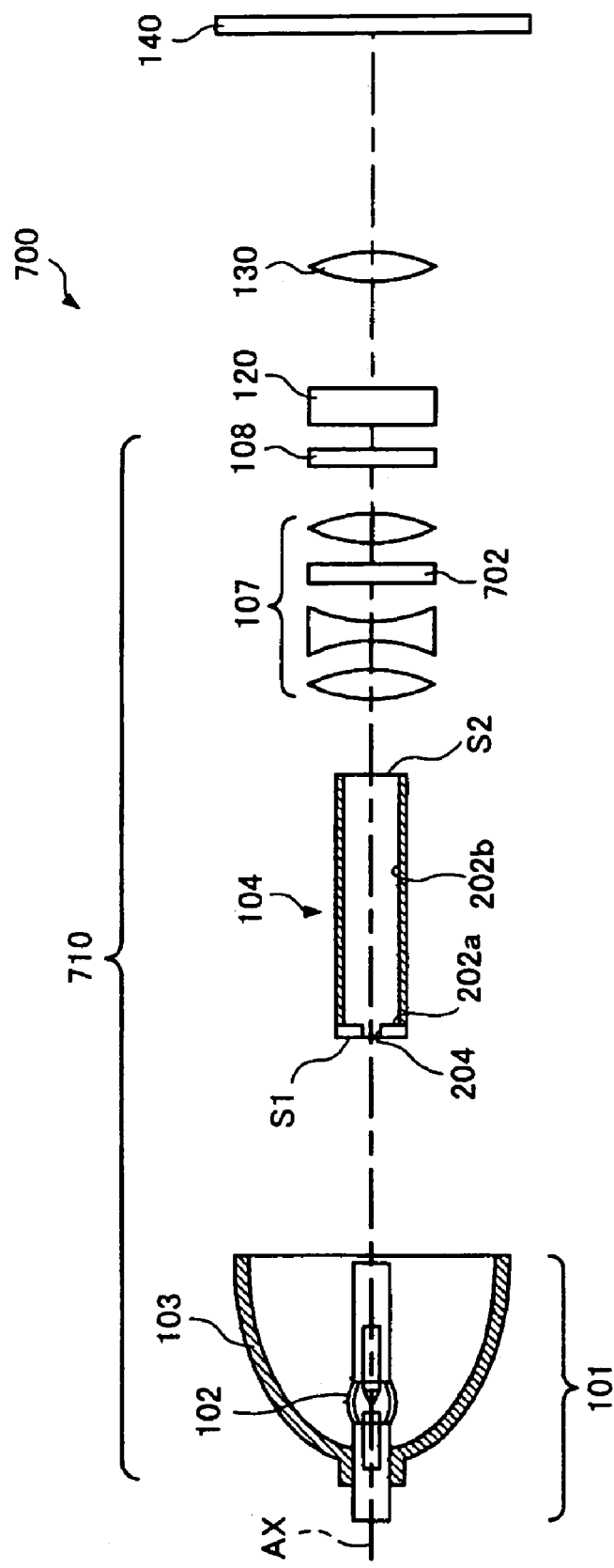
FIG. 7 is a drawing of a general structure of a projector according to a third embodiment of the invention.

FIG. 7 shows a general structure of a projector 700 according to a third exemplary embodiment of the invention. Any part, which also appears as the same function in the first embodiment, is provided with the same reference number as it has in the first embodiment, and any duplicated description for such a part is omitted. The projector 700 of the exemplary embodiment is characterized by an illuminator 710 equipped with a polarization conversion element 702 in it. As shown in FIG. 7, the polarization conversion element 702 is placed at a position on a side of the emission side of the rod integrator 104, and it is between a biconvex lens and biconcave lens of the condenser lens 107. The polarization conversion element 702 converts the light from the light source 101 into the polarized light of a certain oscillating direction, e.g., P-polarized light and emits it.

Figure 8:
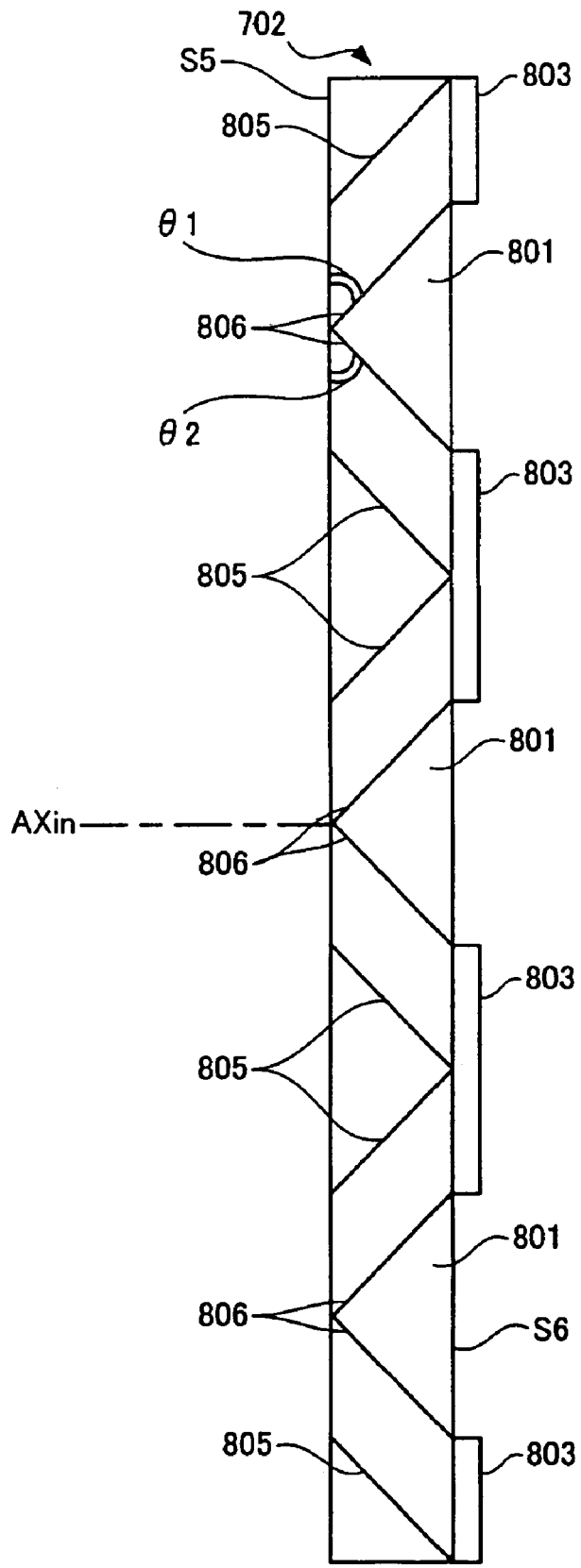
FIG. 8 is a drawing of a general structure of a polarization conversion element.

The light, converted into P-polarized light by the polarization conversion element 702, enters the color filter 108, as it does in the embodiments described above. Any light, which the color filter 108 reflects as light of any wavelength ranges other than the certain one, penetrates the polarization conversion element 702 and progresses in the direction toward the rod integrator 104. As FIG. 8 shows, the polarization conversion element 702 is equipped with an injection end S5 that is nearly perpendicular to the centerline axis AXin of the injected light. The lenses from the condenser lens 107 to the polarization conversion element 702 establish a conjugated relationship between the injection end S1 of the rod integrator 104 and the injection end S5 of the polarization conversion element 702.

Furthermore, the condenser lens 107 establishes a conjugated relationship between the emitting end S2 of the rod integrator 104 and the color filter 108.

FIG. 8 shows a structure of the polarization conversion element 702 in its section. The polarization conversion element 702 can include a plurality of polarization separation units 801, a plurality of reflecting surfaces 805, and a plurality of phase plates 803. The polarization separation units 801 are nearly triangular in their cross section, and they are placed to orient their peak points nearly toward the light source 101 (refer to FIG. 7). On the slopes, being shaped to be almost triangular and oriented toward the light source 101, of the polarization separation units 801, a plurality of polarized light separating films 806 are formed. The polarized light separating films 806 are so placed as to have a certain specific angle in relation to the centerline axis AXin of the injected light coming from the light source 101. The polarized light separating films 806 are placed so as to cause an angle of 45 degrees in relation to the injection end S5. The reflecting surfaces 805 are formed to be nearly parallel to the polarized light separating films 806. The phase plates 803 are bonded in regions between each two polarization separation units 801 located side by side on an emitting end S6 of the polarization conversion element 702.

Figure 9:
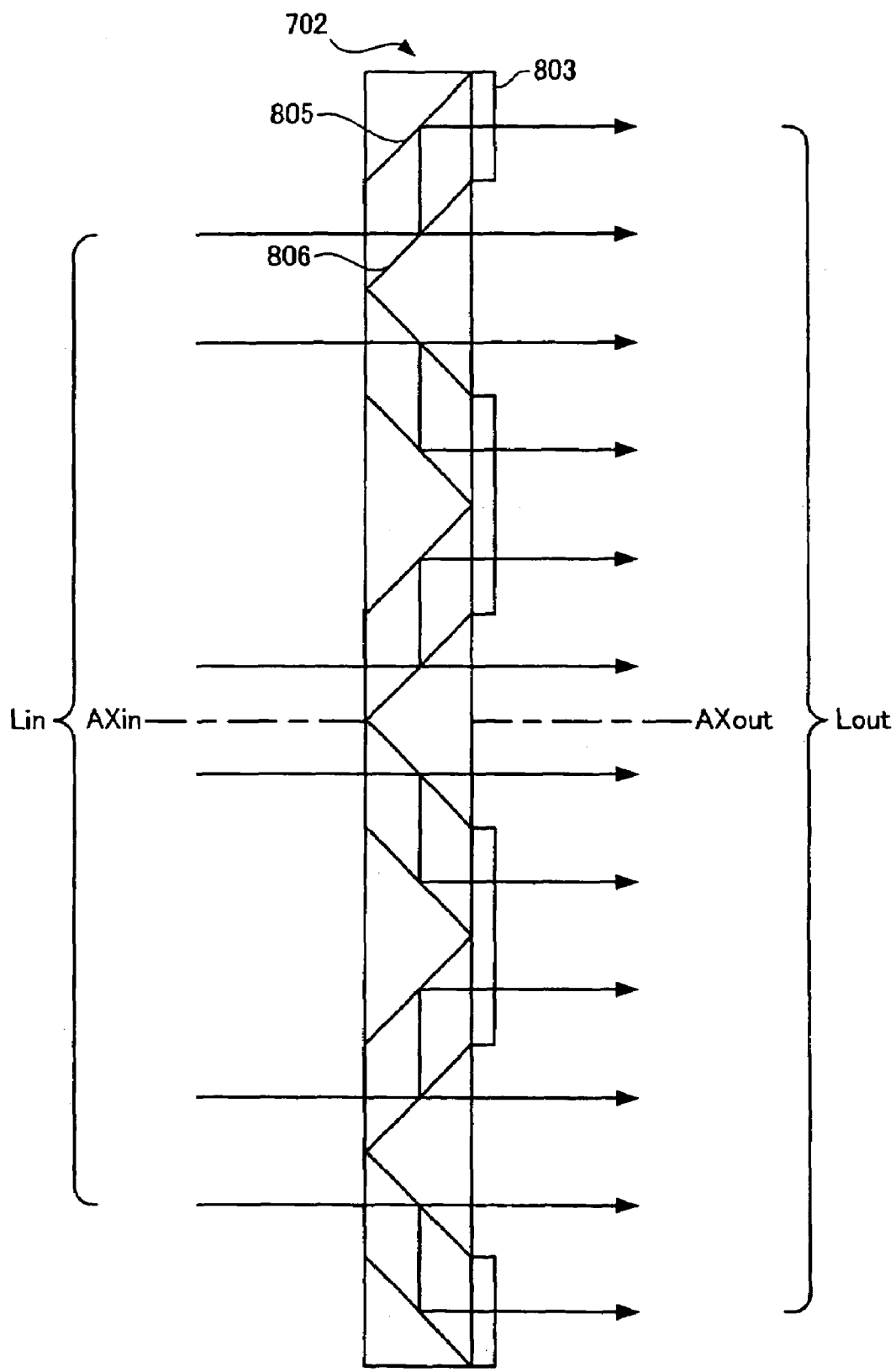
FIG. 9 is for explaining operations of a polarization conversion element.

Operations of the polarization conversion element 702 to convert the injected light into the polarized light of a certain oscillating direction are described below by referring to FIG. 9. The polarized light separating films 806 allow the polarized light, provided with a first oscillating direction, e.g., P-polarized light, among the light injected into the polarized light separating films 806, to penetrate. The P-polarized light, which has penetrated the polarized light separating films 806, gets emitted from the emitting end S6 of the polarization conversion element 702, as it is. Then, the polarized light separating films 806 reflect the polarized light, provided with a second oscillating direction lying nearly at a right angle to the first oscillating direction, e.g., S-polarized light, among the light injected into the polarized light separating films 806. The polarized light separating films 806 reflect the S-polarized light in two directions according to the slopes of the polarization separation units 801. Thus, the polarized light separating films 806 separate the light into the P-polarized light and the S-polarized light.

The S-polarized light reflected in the two directions by the polarized light separating films 806 enters the reflecting surfaces 805 formed at the positions oriented toward the polarized light separating films 806 to be nearly parallel to the polarized light separating films 806. The S-polarized light injected into the reflecting surfaces 805 is reflected in the direction toward the emitting end S6 so that it proceeds almost in the same direction as the P-polarized light, which has penetrated the polarized light separating films 806, proceeds. Then, the S-polarized light, proceeding in the direction toward the emitting end S6, enters the phase plates 803 placed on the emitting end S6. The S-polarized light, which has entered the phase plates 803, is converted into the polarized light, provided with the first oscillating direction, e.g., P-polarized light, and it gets emitted from the polarization conversion element 702 in the same manner, as the P-polarized light, which has penetrated the polarized light separating films 806. Thus, the polarization conversion element 702 converts the injected light into the P-polarized light.

Figure 10:
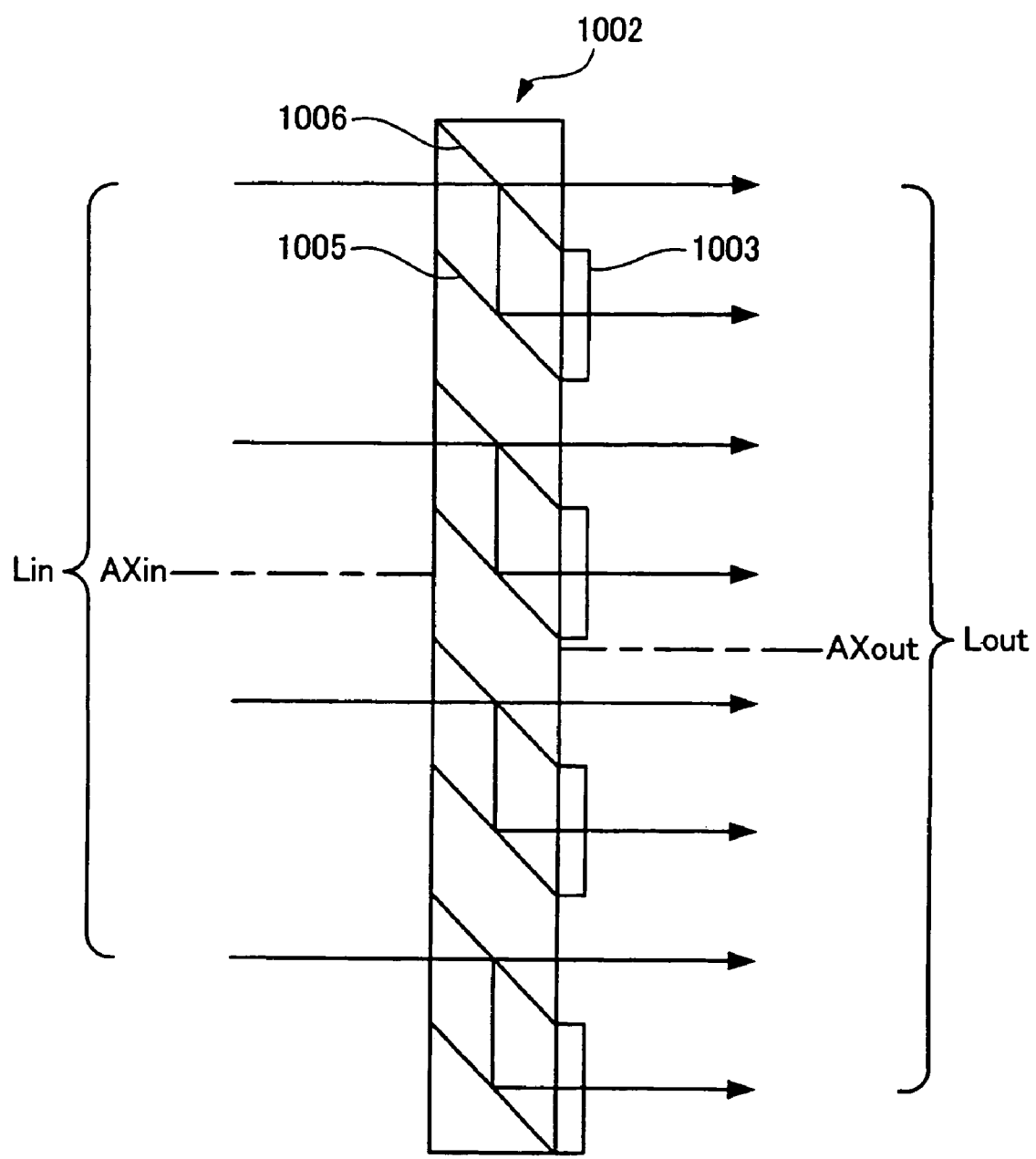
FIG. 10 is for explaining operations of a conventional type of polarization conversion element.

In comparison with the polarization conversion element 702 of the embodiment, herein, polarized light conversion by a conventional type of polarization conversion element 1002 is described below by referring to FIG. 10. A plurality of polarized light separating films 1006 and a plurality of reflecting surfaces 1005 of the polarization conversion element 1002 are both placed so as to be tilted with a certain angle in comparison with the centerline axis AXin of the injected light. Among the light injected into the polarized light separating films 1006, P-polarized light penetrates the films as it is, and S-polarized light is reflected in the direction toward the reflecting surfaces 1005. Then the S-polarized light by the reflecting surfaces 1005 is converted into P-polarized light by a plurality of phase plates 1003, and then it is emitted. In the polarization conversion element 1002, any polarized light separating film 1006 makes its corresponding S-polarized light, reflected by the polarized light separating film itself, always proceed in the same direction, and the light then gets reflected by the reflecting surfaces 1005.

a result, the S-polarized light is converted by the phase plates 1003 into P-polarized light, which subsequently gets emitted through the positions shifted one-sidedly in comparison with the P-polarized light that has penetrated the polarized light separating films 1006. In other words, therefore, the polarization conversion element 1002 shifts the centerline axis of the emitted light AXout in comparison with the centerline axis of the injected light AXin. Such a shift of the centerline axis of the emitted light AXout in comparison with the centerline axis of the injected light AXin means that the centerline axis of the light always gets shifted every time when the light goes back and forth between the injection end S1 of the rod integrator 104 and the color filter 108. Eventually, such a shift of the centerline axis of the light results in an increase of the light that cannot be taken in at the emitting end S2 of the rod integrator 104 and the color filter 108 so that it becomes difficult to efficiently utilize the light.

By returning to FIG. 9 to refer to it, features of the polarization conversion element 702 are described below. The polarization conversion element 702 is characterized by a feature that the centerline axis of the light, injected into the polarization conversion element 702: AXin nearly coincides with the centerline axis of the light, emitted from the polarization conversion element 702: AXout. The polarized light separating films 806 are placed on the slopes of the polarization separation units 801 so that the S-polarized light, reflected by the polarized light separating films 806, progresses in the two directions. Then, the S-polarized light progressing in the two directions is injected into the phase plates 803 by the reflecting surfaces 805. Thus, at the emitting end S6, it is possible to bring the emitting positions of the P-polarized light, which has penetrated the polarized light separating films 806, and the emitting positions of the P-polarized light, which has been converted from the S-polarized light by the phase plates 803, close to each other. Furthermore, as shown in FIG. 9, the S-polarized light, reflected by the polarized light separating films 806 so as to progress in the two directions, is each converted into P-polarized light by the phase plates 803. Subsequently, the converted P-polarized light can be emitted through two positions, which are located at symmetrical points in relation to the position of the P-polarized light passing through the polarized light separating films 806. Therefore, in the polarization conversion element 702, the centerline axis of the injected light: AXin is almost able to coincide with that of the emitted light: AXout.

By having the centerline axis of the injected light: AXin nearly coincide with that of the emitted light: AXout, the light reflected by the color filter 108 (refer to FIG. 7) can be utilized efficiently. When the centerline axis of the injected light, Axin, nearly coincides with that of the emitted light, AXout, the optical axis of the injected light does not get shifted in any direction even after the light has passed through the polarization conversion element 702 many times. Thus, an effect of obtaining the light provided with a certain wavelength range with high efficiency can be produced. Furthermore, by causing an angle of about 45 degrees between the polarized light separating films 806 and the injection end S5, as well as, placing the reflecting surfaces 805 to be nearly parallel to the polarized light separating films 806, the polarization conversion element 702 can emit the light, which is uniformly provided with the first oscillating direction and whose light beams are almost parallel each other. Thus, the color filter 108 can be lit up in a telecentric manner, and an effect of utilizing the light with high efficiency can be produced.

Though, the polarization conversion element 702 is located between the biconcave lens and the biconvex lens of the condenser lens 107 in the present embodiment as shown in FIG. 7, the location of the polarization conversion element 702 is not limited to such an arrangement. As far as the light from the light source 101 can be utilized efficiently, the location of the polarization conversion element 702 can be modified as required for composing the illuminator 710. Furthermore, though the projector 100 of the invention has a structure for displaying images by allowing light to pass through the LCD type spatial light modulator 120, another different structure for displaying images by reflecting light with the LCD type spatial light modulator 120 may also be adopted.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illuminator, comprising:
a light source that supplies light;
a rod integrator that generally uniformizes a luminous intensity distribution of the light supplied by the light source;
a reflective polarizing plate, positioned on an emitting side of the rod integrator, that allows a polarized light of a particular oscillating direction to penetrate and that reflects polarized light of any oscillating directions other than the particular one; and
a color filter that allows the light of a particular wavelength range to penetrate and that reflects the light of any wavelength ranges other than the particular wavelength, among the light that has penetrated the reflective polarizing plate;
the rod integrator being further provided with an injection end on a light source side, an aperture formed in the injection end that lets in the light supplied by the light source, a reflecting part formed around the aperture, and an emitting end on a side of the reflective polarizing plate;
the reflecting part reflecting the polarized light, that has been reflected by the reflective polarizing plate and re-entered into the rod integrator through the emitting end to progress toward the injection end, in the direction toward the emitting end; and
the reflecting part further reflecting the light of any wavelength ranges other than the particular wavelength, which has been emitted through the emitting end and reflected by the color filter to re-enter the rod integrator and progress toward the injection end, in the direction toward the emitting end; and
a lens assembly being placed in a light path between the reflective polarizing plate and the color filter, and
the lens assembly lighting up the color filter in a telecentric manner with the light emitted from the emitting end of the rod integrator so that a main beam from the reflective polarizing plate is substantially parallel to an optical axis of light injected in the direction substantially perpendicular to the color filter.

2. The illuminator according to claim 1, the lens assembly establishing a conjugated relationship between the emitting end of the rod integrator and the color filter.

3. The illuminator according to claim 1, the rod integrator being tapered to be conical so that the area of the injection end is smaller than that of the emitting end.

4. The illuminator according to claim 1, the light of the certain wavelength range, which the color filter allows to penetrate, includes at least red light, green light and blue light.

5. A projector, comprising:
the illuminator according to claim 1;
an LCD type spatial light modulator placed at a position in relation to the color filter to modulate the injected light according to image signals and emit the modulated light; and
a projection lens that projects the light modulated by the LCD type spatial light modulator.

6. A illuminator, comprising:
a light source that supplies light;
a rod integrator that generally uniformizes intensity distribution of the light supplied by the light source;
a polarization conversion element, positioned on an emitting side of the rod integrator, that converts the light from the light source to polarized light of a certain oscillating direction and that emits the converted light; and
a color filter that allows the light of a certain wavelength range to penetrate and that reflects the light of any wavelength ranges other than the certain wavelength among the light emitted from the polarization conversion element;
the rod integrator being further provided with an injection end on a side of the light source, an aperture formed in the injection end for letting in the light supplied by the light source, a reflecting part formed around the aperture, and an emitting end on a side of the polarization conversion element; and
the reflecting part further reflecting the light of any wavelength ranges other than the certain wavelength, which has been reflected by the color filter to re-enter the rod integrator through the emitting end and progress toward the injection end, in a direction toward the emitting end; and
a centerline axis of a pencil of the injected light coming from the light source being substantially coinciding with that of a pencil of emitted light from the polarization conversion element, the pencil of the emitted light beam from the pencil of the injected light.

7. The illuminator according to claim 6, the polarization conversion element comprising:
   a polarization separation unit that orient their peak points nearly toward the light source and their cross section being nearly triangular;
   a plurality of polarized light separating films that are oriented toward the light source, the polarized light separating films being formed on slopes of the polarization separation units; and
   a plurality of reflecting surfaces formed to be nearly parallel to the polarized light separating films;
   the polarized light separating films being disposed so as to have a certain specific angle in relation to a centerline axis of the injected light coming from the light source;
   the polarized light separating films allowing the polarized light, provided with a first oscillating direction, of the light coming from the light source to penetrate, and reflect the polarized light, provided with a second oscillating direction lying nearly at a right angle to the first oscillating direction;
   the reflecting surfaces reflecting the polarized light, provided with the second oscillating direction and reflected by the polarized light separating films, nearly into a same direction as the polarized light of the first oscillating direction progresses; and
   further, in the light path of the polarized light provided with the second oscillating direction that comes from the reflecting surfaces, a plurality of phase plates being installed to convert the polarized light having the second oscillating direction into the polarized light having the first oscillating direction.

8. The illuminator according to claim 7, the polarized light separating films also being equipped with an injection end that is nearly perpendicular to the centerline axis of the injected light, the polarized light separating films and the injection end causing an angle of 45 degrees.

9. A projector, comprising:
   the illuminator according to claim 6;
   an LCD type spatial light modulator placed at a position in relation to the color filter to modulate the injected light according to image signals and emit the modulated light; and
   a projection lens that projects the light modulated by the LCD type spatial light modulator.

* * * * *